US008694446B2

(12) United States Patent
Howard et al.

(10) Patent No.: US 8,694,446 B2
(45) Date of Patent: Apr. 8, 2014

(54) CONTINGENCY PLANNING SYSTEM AND METHOD

(75) Inventors: Michael D. Howard, Westlake Village, CA (US); Alejandro Nijankin, Simi Valley, CA (US)

(73) Assignee: Raytheon Company, Waltham, MA (US)

( * ) Notice: Subject to any disclaimer, the term of this patent is extended or adjusted under 35 U.S.C. 154(b) by 1109 days.

(21) Appl. No.: 12/657,673

(22) Filed: Jan. 26, 2010

(65) Prior Publication Data

US 2011/0184897 A1     Jul. 28, 2011

(51) Int. Cl.
*G06F 1/00*     (2006.01)
*G06N 5/00*     (2006.01)

(52) U.S. Cl.
USPC .............................. 706/13; 382/190; 709/203

(58) Field of Classification Search
USPC ........................................................... 706/13
See application file for complete search history.

(56) References Cited

U.S. PATENT DOCUMENTS

| | | | | |
|---|---|---|---|---|
| 2011/0044533 | A1* | 2/2011 | Cobb et al. | 382/155 |
| 2011/0184604 | A1* | 7/2011 | Franke et al. | 701/23 |

OTHER PUBLICATIONS

An adaptive substrate for agents in an ALife Simulation, Lewis, IC-AI 2006, pp. 1-7.*
Mitchell, M., "Copycat: A Computer Model of High-Level Perception and Conceptual Slippage in Analogy-Making", Thesis, Computer Science, University of Michigan, (1990), pp. 302 total.
Douglas Aberdeen, A (Revised) Survey of Approximate Methods for Solving Partially Observable Markov Decision Processes, Dec. 8, 2003, National ICT Australia, Canberra, Australia, 41 pgs.
Sugato Bagchi, Planning under Uncertainty by Spreading Activation Through an Adaptive Probabilistic Network, Oct. 1994, Electrical Engineering, Nashville, TN, Vanderbilt University, 90 pgs.
D'Mello et al., A Cognitive Science Based Machine Learning Architecture, 2006, Association for Artificial Intelligence, 6 pgs.
Friedlander et al., LIDA and a Theory of Mind, 2008, Artificial General Intelligence (AGI-08), Memphis, TN, 12 pgs.
Marvin Minsky, *The Society of Mind*, Simon & Schuster, NY, NY,1985, all pages.
James A. Hendler, *Integrating Marker-Passing and Problem-Solving*, Lawrence Erlbaum Associates, NJ, 1988, all pages.

\* cited by examiner

*Primary Examiner* — Jeffrey A Gaffin
*Assistant Examiner* — Kalpana Bharadwaj
(74) *Attorney, Agent, or Firm* — Cantor Colburn LLP

(57) ABSTRACT

A contingency planning system apparatus including a world description subsystem responsive to data representing a description of the world related to a planning problem and configured to instantiate a plurality of world codelets in a codelet workspace. A coderack subsystem is responsive to a slipnet network and is configured to instantiate a plurality of codelets in the codelet workspace each having one or more slots for binding with binding sites of lower level codelets and configured to monitor constraint changes thereto and propagate those changes to any related codelets. A temperature subsystem is configured to detect when temperature in the codelet workspace has reached a predetermined level indicating a satisfactory solution to the planning problem has been achieved. A plan extractor is responsive to the temperature subsystem and is configured to extract one or more contingency plans from the codelet workspace when the predetermined temperature is reached and configured to cause the temperature subsystem change the temperature in the codelet workspace such that the plurality of codelets will develop new bindings representing new solutions to the planning problem.

19 Claims, 5 Drawing Sheets

CONTINGENCY PLANNING SYSTEM AND METHOD

FIELD OF THE INVENTION

The subject invention relates to a contingency planning system and method.

BACKGROUND OF THE INVENTION

Some conventional planning systems may utilize a Partially Observable Markov Decision Process (POMDP) that incorporates uncertainty about an agent's perceptions, actions, and feedback. One problem with this approach is that the systems may rely on a "blind" search from the initial state and then generate every state that can be reached from the initial state by any possible action. The systems repeat this process until the goals or solutions to the planning problem are found. But, for many planning problems, it is not easy to estimate progress towards the goals, so the systems typically "blindly" plan until the goal is found and then back-up a "reward" value to choose the best course of action. But for POMDP problems, it is not computationally feasible to continue planning until the solution to the planning problem is found, so most conventional planning systems may limit the search horizon severely to make the problem tractable. Thus, even for simplified finite-horizon POMDPs, finding an optimal solution to a POMDP problem is difficult.

Some cognitively-inspired planning systems may rely on cognitive models such as those disclosed in "Minsky's Society of Mind", M. Minsky, Simon & Schuster, Inc., New York, N.Y. (1985), "Copycat: A Computer Model of High-Level Perception and Conceptual Slippage in Analogy-Making", M. Mitchell, Computer Science, PhD, University of Michigan (1990), and "LIDA and a Theory of Mind", B. Goertzel, P. Wang, Artificial General Intelligence (AGI-08), IOS Press, Memphis, Tenn., (2008), all of which are incorporated by reference herein.

These cognitive models may build perceptual structures in data using small knowledge processes called "codelets." Alternative choices arise naturally based on relevance to the problem and the codelets compete in a winner-take-all manner. Some conventional planning systems use such cognitive models to build plans linearly by searching from initial conditions toward the goals or search regressively from goals to initial conditions. One problem with this approach is that the planning systems may lack scalability and typically do not accommodate a distributed design. The codelets are also conceived in the context of an analogy system. These systems also may not maintain multiple competing hypotheses.

BRIEF SUMMARY OF THE INVENTION

In one aspect, a contingency planning system apparatus is featured including a world description subsystem responsive to data representing a description of the world related to a planning problem and configured to instantiate a plurality of world codelets in a codelet workspace. A coderack subsystem is responsive to a slipnet network and is configured to instantiate a plurality of codelets in the codelet workspace each having one or more slots for binding with binding sites of lower level codelets and each configured to monitor constraint changes thereto and propagate those changes to any related codelets. A temperature subsystem is configured to detect when temperature in the codelet workspace has reached a predetermined temperature indicating a satisfactory solution to the planning problem has been achieved. A plan extractor is responsive to the temperature subsystem configured to extract one or more contingency plans from the codelet workspace when the predetermined temperature is reached and configured to cause the temperature subsystem change the temperature in the codelet workspace such that the plurality of codelets will develop new bindings representing new solutions to the planning problem.

In one embodiment, the world description subsystem may be responsive to an environmental interface which provides situational updates which may affect the constraints of one or more of the plurality of codelets instantiated in the codelet workspace. The population of world codelets instantiated in the codelet workspace may be configured to represent a description of the world as it relates to the achieving the goals of the planning problem. The codelet workspace may be configured to determine a satisfaction level therein which represents the amount of binding between the slots of codelets and the binding sites of lower level codelets and the amount of time instantiated codelets have been in the codelet workspace. The binding of codelets to other codelets in the codelet workspace may increase the satisfaction level in the codelet workspace. The satisfaction level of the bound codelets in the codelet workspace may be affected by competition and cooperation between instantiated codelets in the codelet workspace. The slipnet network may include a plurality of linked concept nodes wherein each node represents a type of codelet, each link represents a relationship between two types of codelets, and the collection of linked concept nodes represents an ontology of concepts. The slipnet network may be responsive to activation levels of related types of bound codelets in the codelet workspace and is configured to activate certain concept nodes based on the activation level in order to increase the probability the coderack subsystem will instantiate a codelet of a particular type relevant to achieving the solution to the planning problem. The temperature subsystem may be configured to raise or lower the temperature in the codelet workspace as a function of the satisfaction level. The temperature subsystem may be configured to detect unbound world codelets in the codelet workspace and raise the temperature in the codelet workspace as a function each unbound world codelet. The plan extractor subsystem may notify the temperature subsystem to raise the temperature in the codelet workspace such that the plurality of codelets will develop different bindings representing a different solution to the planning problem. The plurality of codelets may be distributed among different physical computing devices.

In another aspect, a contingency planning method is featured including instantiating a plurality of world codelets in a codelet workspace. A plurality of codelets is instantiated in the codelet workspace each having one or more slots for binding with the binding sites of lower level codelets and each configured to monitor constraint changes thereto and propagate those changes to any related codelets. The temperature in the codelet workspace is detected to determine if the temperature has reached a predetermined temperature indicating that a satisfactory solution to the planning problem has been achieved. One or more contingency plans are extracted from the codelet workspace when the predetermined temperature is reached and then the temperature in the codelet workspace is changed such that the plurality of codelets will develop new bindings representing new solutions to the planning problem.

In one embodiment, the method may include the step of providing situational updates that affect the constraints of one or more of the plurality of codelets instantiated in the codelet workspace. The method may include the step of determining a satisfaction level in the codelet workspace which represents the amount of binding between the slots of codelets and the binding sites of lower level codelets and the amount of time instantiated codelets have been in the codelet workspace. The method may include the step of providing a slipnet network responsive to an activation level of related bound codelets in the codelet workspace and activating certain concept nodes based on that the activation level to increase the probability of instantiating codelets of a particular type in the codelet workspace. The method may include the step of raising or lowering temperature in the codelet workspace as a function of the satisfaction level. The method may include the step of detecting unbound codelets in the codelet workspace and raising the temperature therein as a function of each unbound world codelet. The method may include the step of raising the temperature in the codelet workspace such that the plurality of codelets will develop different bindings representing a different solution to the planning problem.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
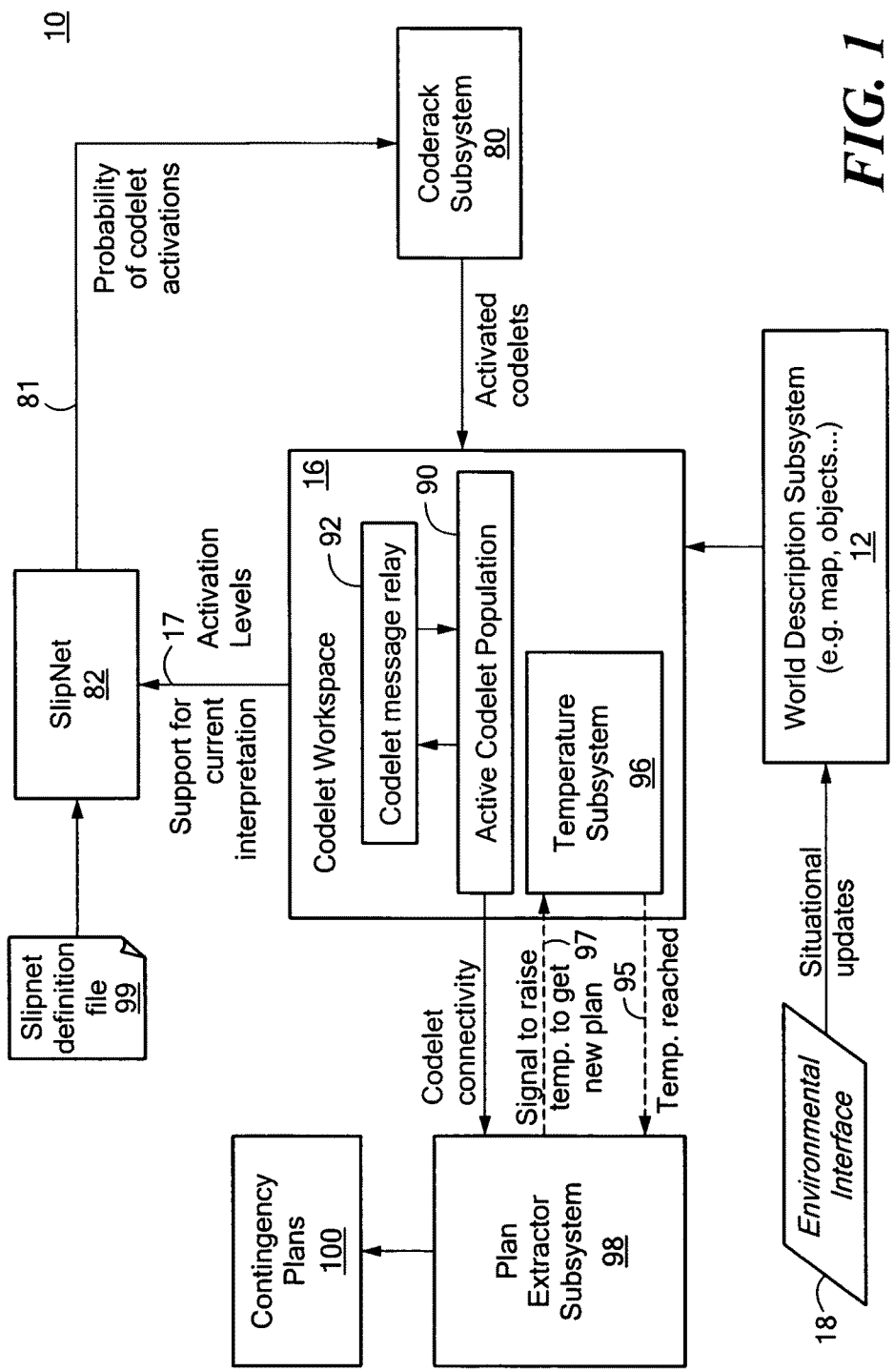
FIG. 1 is a schematic block diagram showing one embodiment of the primary components of the contingency planning system of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 one embodiment of contingency planning system apparatus 10 of this invention. System 10 includes world description subsystem 12 (e.g., an appropriately programmed processor or circuit) configured to instantiate a plurality of world codelets in codelet workspace 16 (also an appropriately programmed processor or circuit) in response to data representing a description of the world related to a planning problem. In one embodiment, world description subsystem 12 receives the data, e.g., terrain data, intelligence data, force data, sensor data, situational updates, and any relevant data related to finding a solution to the planning problem, from environmental interface 18.

Figure 2:
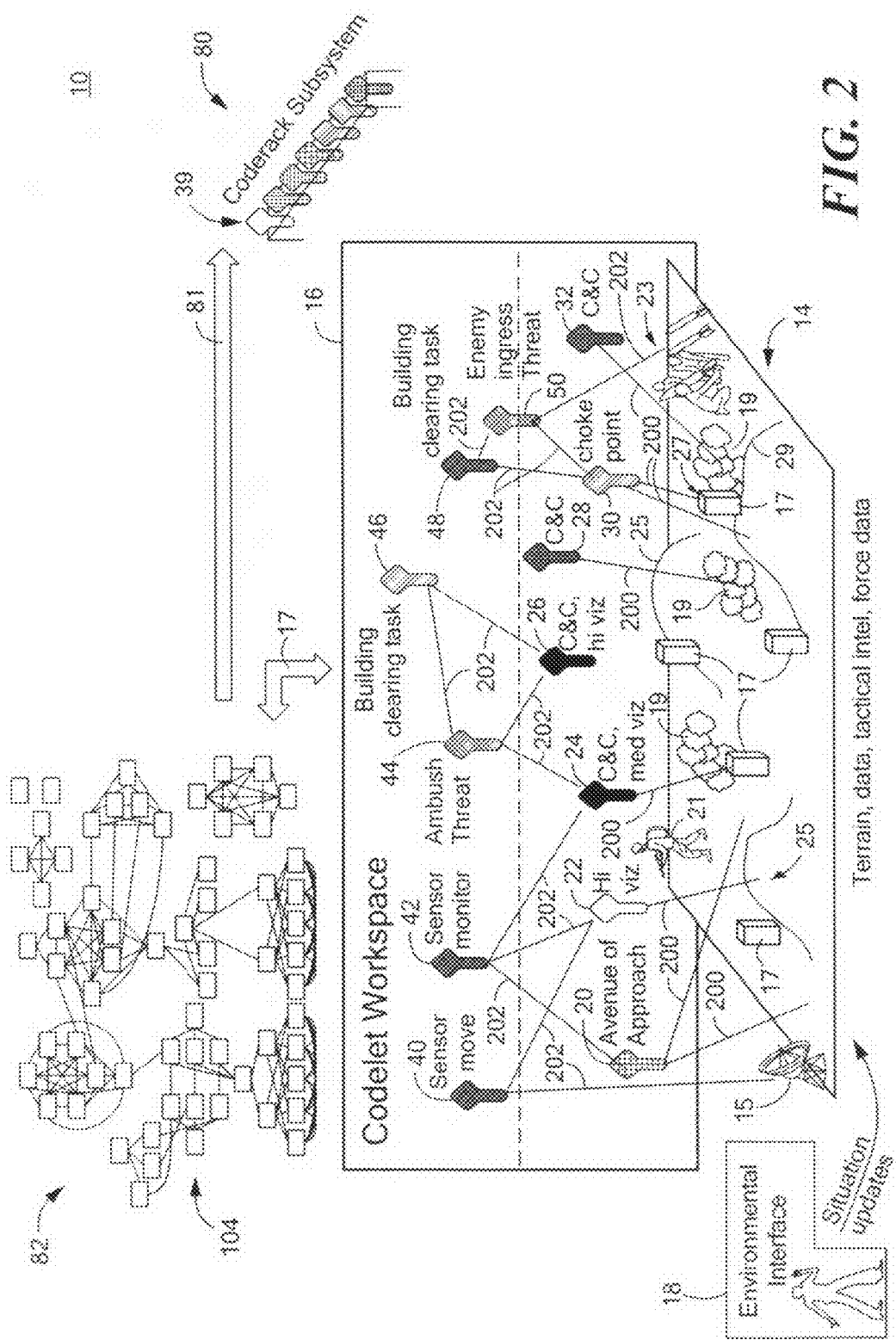
FIG. 2 is a three-dimensional view showing one embodiment of the contingency planning system shown in FIG. 1.

FIG. 2 shows one example of a plurality world codelets 14 instantiated in codelet workspace 16. World codelets 14 are a special type of codelet which represent the likelihood of location and capabilities of relevant situational elements provided by environmental interface 18, such as entities, key terrain, and the like. In this example, world codelets 14 may include world codelets for entities such as sensor 15 (e.g., a radar or similar type device), structures or buildings 17, cover and concealment (C & C) 19, soldiers 21, and enemy 23. World codelets 14 may also include key terrain features which are preferably the result of terrain analysis and tactically significant features of the terrain are preferably represented, e.g., world codelets for high grounds 25, checkpoint 27, and ridgeline 29, and the like. World codelets 14 are preferably updated as situational information arrives from environmental interface 18 and as tactical significance change. Preferably, the population of world codelets 14 instantiated in codelet workspace 16 represents a description of the world as it relates to the planning problem. In practice, world codelets 14 are not limited to the example of world codelets shown in FIG. 2, as the world codelets 14 may include any number and type of codelets which are needed to describe a description of the world as it relates to a planning problem.

Coderack subsystem 80 (e.g., an appropriately programmed processor or circuit), instantiates a plurality of codelets in codelet workspace 16. Each of the codelets instantiated in codelet workspace 16 includes one or more slots for binding with lower level codelets and is configured to monitor constraint changes thereto and propagate those changes to any related codelets. Each of the codelets generated by coderack subsystem 80 is preferably a small knowledge process representing a descriptive concept. The codelets link themselves into hierarchical structures on top of the situational data from environmental interface 18, and the "highest level" of the codelets represent tactical elements of the a plan that can achieve the situation and goals represented by the world codelets. Such a technique is naturally distributed and adapts dynamically to changing conditions.

Figure 3:
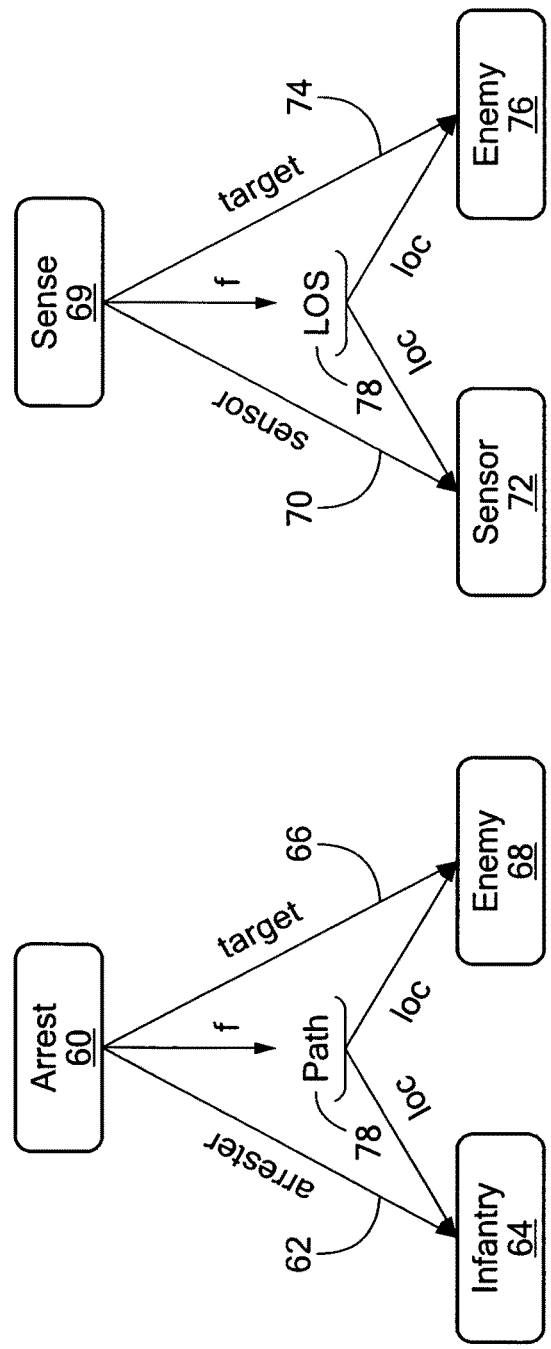
FIG. 3 is a schematic block diagram showing a few examples of codelets having slots binding to binding sites of lower level codelets in the codelet workspace in accordance with one embodiment of this invention.

For example, arrest codelet 60, FIG. 3, includes arrestor slot 62 for binding with the binding sites of world infantry codelet 64 and target slot 66 for binding with the binding sites of enemy codelet 68. In another example, sense codelet 69 includes sensor slot 70 for binding with the binding sites of sensor codelet 72 and target slot 74 for binding with binding sites of enemy codelet 76.

The description on a slot may refer to a specific type of world codelet such as infantry or it may refer to a capability that any world codelet may have. For example, arrestor slot 62 may bind to any world codelet capable of arresting an enemy and that will, therefore have an arrestor binding site. As another example: a sensor slot which can bind to the sensor binding site of a radar entity. But, the sensor slot may also bind to the sensor binding site on an infantry entity. Both the infantry and the radar can sense, albeit to different degrees of ability.

Figure 4:
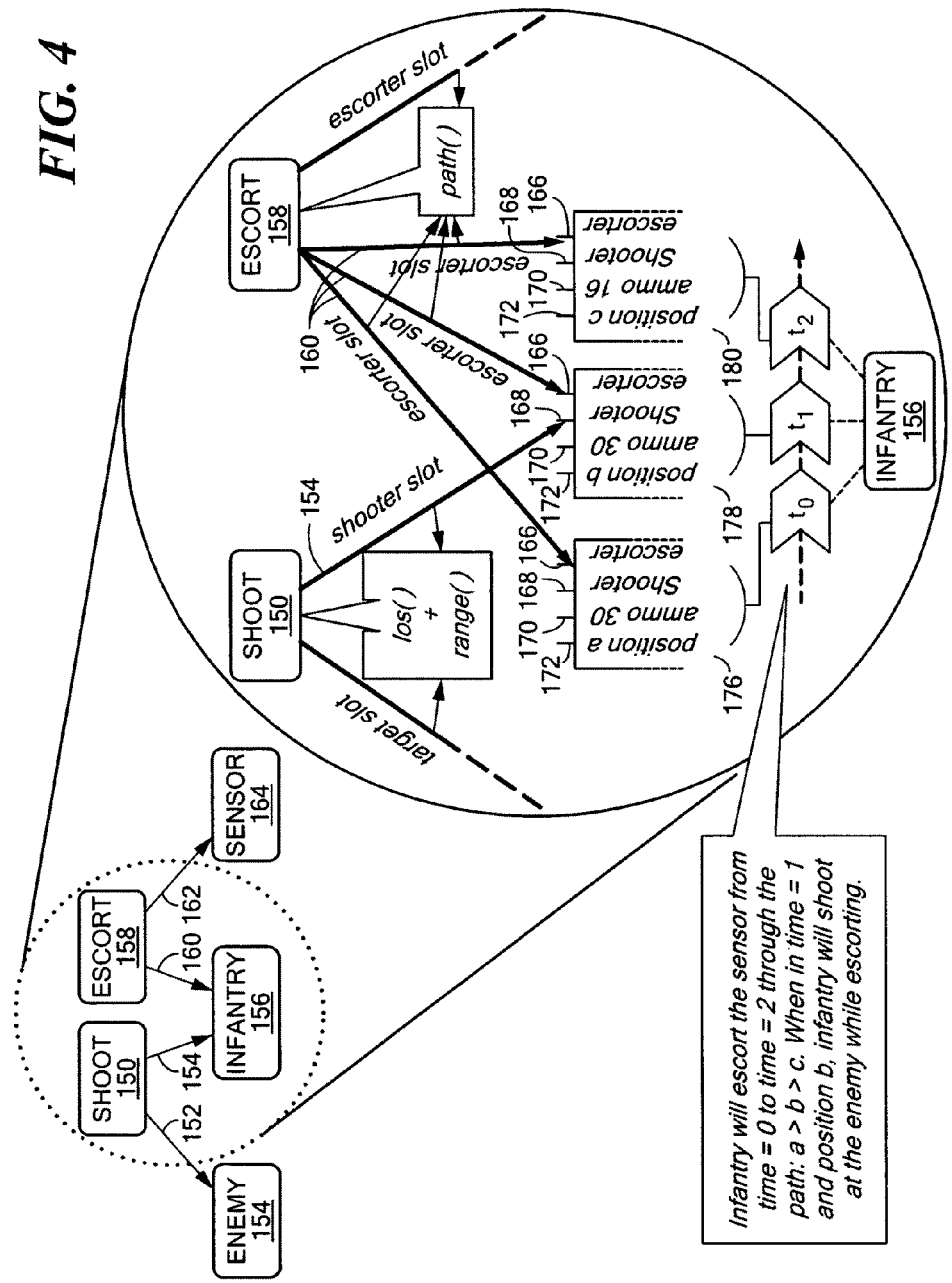
FIG. 4 is a schematic block diagram showing in further detail one example of the binding of the slots of codelets to the binding sites of lower level codelets.

FIG. 4 shows in further detail one embodiment of the binding of the slots of codelets with the binding sites of lower level codelets. In this example, shoot codelet 150 includes target slot 152 for binding to the binding sites of enemy codelets 154 and shooter slot 154 for binding to binding sites of infantry codelets 156. Escort codelet 158 includes escorter slot 160 for binding to the binding sites of infantry codelet 156 and escorter link 162 for binding with the binding sites of sensor codelet 164. As shown in the exploded view, infantry codelet 156 includes escorter binding site 166, shooter binding site 168, ammo binding site 170 and position binding site 172. Three temporal sets of these binding sites are shown, each representing three different points in time when a higher level codelet can link to these sites. In effect, a link represents a reservation for an action the infantry codelet is able to perform. In this example, shooter slot 154 of shoot codelet 150 has bound to shooter binding site 168 of infantry codelet 156 at time $t_1$. Escorter slot 160 of escort codelet 158 has bound to escorter binding site 166 at times $t_0$ and $t_2$. Thus, the infantry will escort the sensor from time $t_0$, through time $t_2$ through path a>b>c, indicated at 176, 178, and 180, respectively. At time $t_1$ and at position b-178, the infantry will shoot at the enemy while escorting. In one embodiment, the world codelet may start with a template for actions that can be performed at any time period and during system operation. The template may be instantiated for different time periods as needed by the higher level codelets. In this way, a plan for coordinated action between many entities can be created as an emergent process of the interactions between distributed codelets.

Each of the plurality of codelets generated by coderack subsystem 80 monitors their respective constraint changes and then propagates those changes to all related bound codelets in codelet workspace 16. Path functor 78, FIG. 3, of arrest codelet 60, is an example of a constraint between infantry world codelet 64 and enemy world codelet 68 that needs to be satisfied. A constraint is an allowable range of values of a metric based on the values of the codelets to which it is it is bound. In this example, the constraint requires there be a path between two locations or entities. Functors compute relationships between codelets and are a way the codelets check and monitor their constraints. Functors re-compute their values any time the codelets to which they are bound change, e.g., if the location changes, there may no longer be a path. For example, any constraint changes to any of world codelets 14, FIG. 2, will propagate to all codelets which are bound to the particular world codelet. The constraint change then propagates to all codelets which are bound to that world codelet. In this one example, a constraint change to enemy world codelet 23 (e.g., the enemy moves thereby changing its location property) will propagate to codelet 50. That constraint change will then propagate to building clearing task codelet 48, which may be threatened by the possibility of enemy ingress codelet 50.

In one exemplary operation of system 10, coderack subsystem 80, responsive to slipnet network 82 (discussed below), instantiates one of codelets 39, FIG. 2, into codelet workspace 16. Each of the codelets instantiated into codelet workspace 16 is preferably eligible to be given time-slices in codelet workspace 16. Initially, at each cycle of operation, coderack subsystem 80 randomly selects one of codelet 39 to be given a time slice to search for binding sites. After a number of codelets has been instantiated in codelet workspace 16, the way in which coderack subsystem 80 instantiates the codelets in codelet workspace 16 is influenced by slipnet network 82 (discussed below). In this example, codelets 20, 22, 24, 26, 28, and 32 having various processes, e.g., avenue of approach, high visibility, cover and concealment (C & C), choke point, and the like, have been instantiated in codelet workspace 16. In this illustration, codelets 20-32 have slots for binding with the binding sites world codelets 14. Once instantiated in codelet workspace 16, codelets 20-32 search for world codelets which have binding sites which match their slots and bind thereto, e.g., as shown at 200. Similarly, in this example, codelets 40, 42, 44, 48, and 50, e.g., sensor move, sensor monitor, ambush threat, building clearing task, and enemy ingress threat, are instantiated in codelet workspace 16. Codelets 40-50 then search for lower level codelets having binding sites which match their slots and bind thereto, e.g., as shown at 202. Codelets 40-50 may bind with lower level codelets 20-32 or any of world codelets 14.

As shown at 90, FIG. 1, the active instantiated codelets in codelet workspace 16 communicate via codelet messages relayed between codelets by codelet workspace 16 as shown at 92.

When a codelet binds to the binding site of another codelet in the codelet workspace 16, the binding decreases the amount of activation energy loss that the binding codelets experience over time. Codelet workspace 16 preferably determines the satisfaction level therein which represents the ratio of existing binding to necessary binding between each of the slots of each of the codelets with the binding sites of lower level codelets. In the example shown in FIG. 2, the satisfaction level in codelet workspace 16 may be determined by the successful binding of codelets 20-32 with respective world codelets 14 and the binding of codelets 40-50 with the lower level codelets and world codelets and world codelets as shown. In one embodiment, the activation energy of the bound codelets in the codelet workspace 16 is affected by competition and cooperation between instantiated codelets in the codelet workspace 16.

Codelet workspace 16 then communicates the activation levels of related types of bound codelets in codelet workspace 16 to slipnet network 82, as shown at 17. In one design, slipnet network 82, (e.g., an appropriately programmed processor or circuit), may include a plurality of linked concept nodes 104, FIG. 2. Each of concept nodes 104 preferably represents a type of codelet and each link represents a relationship between two types of codelets. The collection of linked concept nodes represents an ontology of concepts. Slipnet network 82 preferably spreads activation from highly activated concept nodes 104 to adjacent less activated nodes. Slipnet network 82 then preferably activates certain concept nodes based on the activation energy of related bound codelets in codelet workspace 16 to increase the probability the coderack subsystem 80 will instantiate a particular codelet in codelet workspace 16.

When a codelet successfully binds in codelet workspace 16, its activation energy is added to its related concept node 104 in slipnet 82. The activation of slipnet 82 is spread through slipnet links to closely related nodes in the slipnet. This adds to the activation of those codelets, which is transmitted to coderack subsystem 80, indicated at 81, FIGS. 1 and 2, raising the likelihood that codelets of those types will be instantiated into codelet workspace 16. Slipnet 82 is likely to link together concepts that are opposite, since that is a close ontological connection between the concepts. This means that when one concept becomes active in slipnet 82, its opposite will also become active. The result is multiple competing codelets may be active at the same time, with different activation energies reflecting their goodness of fit with the situation.

When a codelet is instantiated into codelet workspace 16, the activation energy in slipnet network 82 corresponding with the type of the said codelet is decremented. In this way, an overabundance of codelets of the same type is avoided. Additionally, this allows for a variety of codelet types to be instantiated in codelet workspace 16. This pushes system 10 to explore a variety of possible contingencies. If a codelet has been in codelet workspace 16 for too long without binding it gradually ages. As the codelet ages, its activation energy is decremented until it becomes too low for it to survive. A codelet with too low activation energy "dies out" and is promptly removed from codelet workspace 16. The removal of failed codelets does not have any influence on the slipnet network.

One of the preferred search strategies of system 10 is that it may explore many possible courses of action in parallel at a speed and to a depth proportional to moment-to-moment evaluations of their promise. This may be done using the satisfaction level that grows as the codelets become connected into perceptual structures in codelet workspace 16. Such structures represent potential interpretations or hypotheses, which gains satisfaction level as a function of the number of codelets support them.

Each of the instantiated codelets in codelet workspace 16 has several terms in its satisfaction level. There is a reward factor that is pre-defined based on the solution to the planning problem and a goodness of fit factor which is based on the activation energy of supporting codelets to which the codelets have bound to lower level codelets. Each slot in the codelets preferably has a weight that multiplies the activation energy of a codelet bound to a lower codelet. These weights are used to calculate the satisfaction level, or strength, of a higher level codelet, i.e., a codelet which is not a world codelet. For example, as shown in FIG. 3, if arrest codelet 60 is activated in codelet workspace 16, it will attempt to bind to an infantry codelet 64 and enemy codelet 68 in codelet workspace 16. The satisfaction level of the arrest codelet 60 will be a function of the codelets to which it is bound (or which remain unbound), which in this case would be the infantry codelet 64 and the enemy codelet 68. In this example, because infantry codelet 64 and enemy codelets 68 happen to be world codelets they have no satisfaction level and the satisfaction of higher level arrest codelet 60 is purely a function of whether or not all its binding sites (slots) are bound (i.e., arrester binding slot 62 and target binding slot 66). If a binding site requires binding to another high-level codelet (not a world codelet), then the satisfaction level of the parent codelet is a function of the binding being satisfied, as well as the satisfaction level of the bound child codelet. Path functor 78 limits which infantry and enemy codelets can be bound to. But, when the activation energy of the arrest type codelet is introduced into slipnet 82, FIGS. 1 and 2, it is spread to related nodes like "shoot", which is a different, but related in a way, to handle interactions with enemies. The raised energy in the Shoot concept node in slipnet 82 raises the likelihood that "shoot" codelets will be posted by coderack subsystem 80, which randomly picks a codelet to activate with a likelihood that is a function of its activation energy. When a codelet is activated, it has a certain amount of time, which is related to its activation energy, to go into the codelet workspace 16 and look for other codelets to bind to. An activation decay process slowly clears out unsuccessful bindings of codelets in codelet workspace 16. Activation energy decays for codelets in the codelet workspace 16 that remain unbound after being given a certain number of run cycles. World codelets preferably do not decay, but the semantic codelets that represent interpretations about them can die out if they do not become completely satisfied by finding enough world codelets to bind to.

Temperature subsystem 96, FIG. 1 (e.g., an appropriately programmed processor or circuit) raises or lowers the temperature in codelet workspace 16 as a function of the overall satisfaction level of all codelets in codelet workspace 16. In one embodiment, temperature subsystem 96 detects unbound world codelets in the codelet workspace and raises the temperature in the codelet workspace as a function of each unbound world codelet. Temperature subsystem 96 preferably lowers the temperature in the codelet workspace 16 as the ratio of bound to unbound codelets in codelet workspace 16 increases which indicates the codelets are closer to developing a solution to the planning problem. Temperature subsystem 96 detects when temperature in the codelet workspace has reached a predetermined level which indicates that a satisfactory solution to the planning problem has been achieved (discussed below).

Plan extractor 98 (e.g., an appropriately programmed processor or circuit) is responsive to signal 95 from temperature subsystem 96 and when the predetermined temperature is reached it extracts one or more contingency plans 100 from codelet workspace 16. Plan extractor subsystem 98 extracts and outputs contingency plans 100 by querying each codelet in codelet workspace 16 for a wordy description of the action. After one or more contingency plans 100 are generated, plan extractor subsystem 98 notifies temperature subsystem 96 by signal 97 to raise the temperature in the codelet workspace such that the codelets in codelet workspace 16 will develop new bindings representing new solutions to the planning problem.

In one example, the temperature in the codelet workspace 16 is influenced by a predetermined "simulated annealing" regimen in which the temperature is changed by temperature subsystem 96 to weed out weak codelets. In that example, the temperature is a function of the satisfactory binding of world codelets which ensures that the solution takes all relevant situational information into account. The temperature may be computed using the formula:

$$\text{temperature} = \frac{t}{2\pi/\Delta\alpha} \cdot \left(1 - \frac{codelets_{solved}}{codelets_{total}}\right) \qquad (1)$$

where t equals the time remaining for annealing $\Delta\alpha$ equals the change in the sine function of the annealing function, $codelets_{total}$ is the total number of world codelets instantiated in the codelet workspace, and $codelets_{solved}$ equals the number of satisfied world codelets in the codelet workspace, i.e. having all their slots bound to the binding sites of lower level codelets. There are many ways one skilled in the art might impose a simulated annealing schedule. In this example, the $\Delta\alpha$ factor indicates a function of a sine wave that reduces the amplitude of the sine wave as time t reduces to 0. The maximum temperature is when no world codelets are solved, i.e. when they have no higher level codelets bound to them or the codelet hierarchy bound to them is not fully satisfied, e.g., when they have unbound links. In that situation, equation (1) reduces to:

$$\text{temperature} = \frac{t}{2\pi/\Delta\alpha} \qquad (2)$$

The maximum of the sine function is 1, so the maximum of the temperature can be expressed as:

$$\text{maximum temperature} = \frac{t}{2\pi} \qquad (3)$$

where t is the maximum time remaining for annealing. The maximum t would be a predetermined time period which may be set based on the number of world codelets to be incorporated into the solution, as known by those skilled in the art.

One heuristic for setting t may be on a 2 GHz processor using 100 times the number of world codelets.

The minimum temperature of zero will be reached at t=0; i.e. when there is no time remaining for the current annealing schedule.

So, the temperature starts at $$\frac{t}{2\pi}$$

and when it reaches 0, the plan is ready to be extracted by plan extractor subsystem 98. At such a low temperature, codelets in the codelet workspace have reached set of bindings that makes them highly satisfied. After a plan is extracted, the temperature is raised in codelet workspace 16 by signal 97 sent from the plan extractor subsystem 98 to temperature subsystem 96. Raising the temperature in codelet workspace 16 breaks up the existing plan, and allows a new, alternative plan to develop. Due to the randomness of the process, it is unlikely that exactly the same plan will be created.

When the temperature is raised, more breakers (discussed below) will be generated to attack established bound codelets resulting in a higher chance that a bound codelet will have its bindings broken and will be removed from codelet workspace 16. Also, more competing codelets will be introduced to grab those bindings. The number of breakers may be calculated using the equation:

$$\#breakers = temperature \cdot C \quad (4)$$

where C is a "cruelty constant" (an integer) of codelet workspace 16.

Breakers help by breaking codelet bindings if the codelets either contradict or are exact duplicates of some other codelet, or if they are simply low on activation energy and without enough formed bindings to lower level codelets. This induces competition between alternatives. Breakers are generated by codelet workspace 16 according to the temperature, e.g., when the temperature is high, breaker activity is high. The breakers cause the codelet workspace 16 to scout for any other codelets. In general, the role of the breaker is to attack competing interpretations of a concept. This allows system 10 to implement a way to have alternative solutions to the planning problem. Once a breaker finds a different codelet in codelet workspace 16, it uses a reference to particular codelet for which a particular breaker was generated to compare the two and find if they contradict or if they are exact duplicates. If they contradict or are duplicates, the breaker attempts to break the found codelet. A codelet may resist a breaker codelet if its activation energy is greater than that of the codelet that generated the breaker. There also exists a random factor that might aid a breaker in breaking a stringer codelet, but this is unlikely. If the breaker succeeds in breaking the target codelet, it signals the codelet found to break up all of its existing bindings and look for new ones. A codelet contradicts another codelet when it specifies the use of some limited resource that is already being used by the other codelet. For example, a shoot codelet contradicts an arrest codelet if both use the same infantry entity at the same time, e.g., it is not possible for a single unit both shoot and arrest simultaneously. Another example of contradiction is when two friendly entities are used by two separate codelets to act simultaneously on the same enemy entity.

In one embodiment, the plurality of codelets instantiated in codelet workspace 16, e.g., as shown in FIG. 2, may be distributed and may be located on different physical computer devices at different locations.

Figure 5:
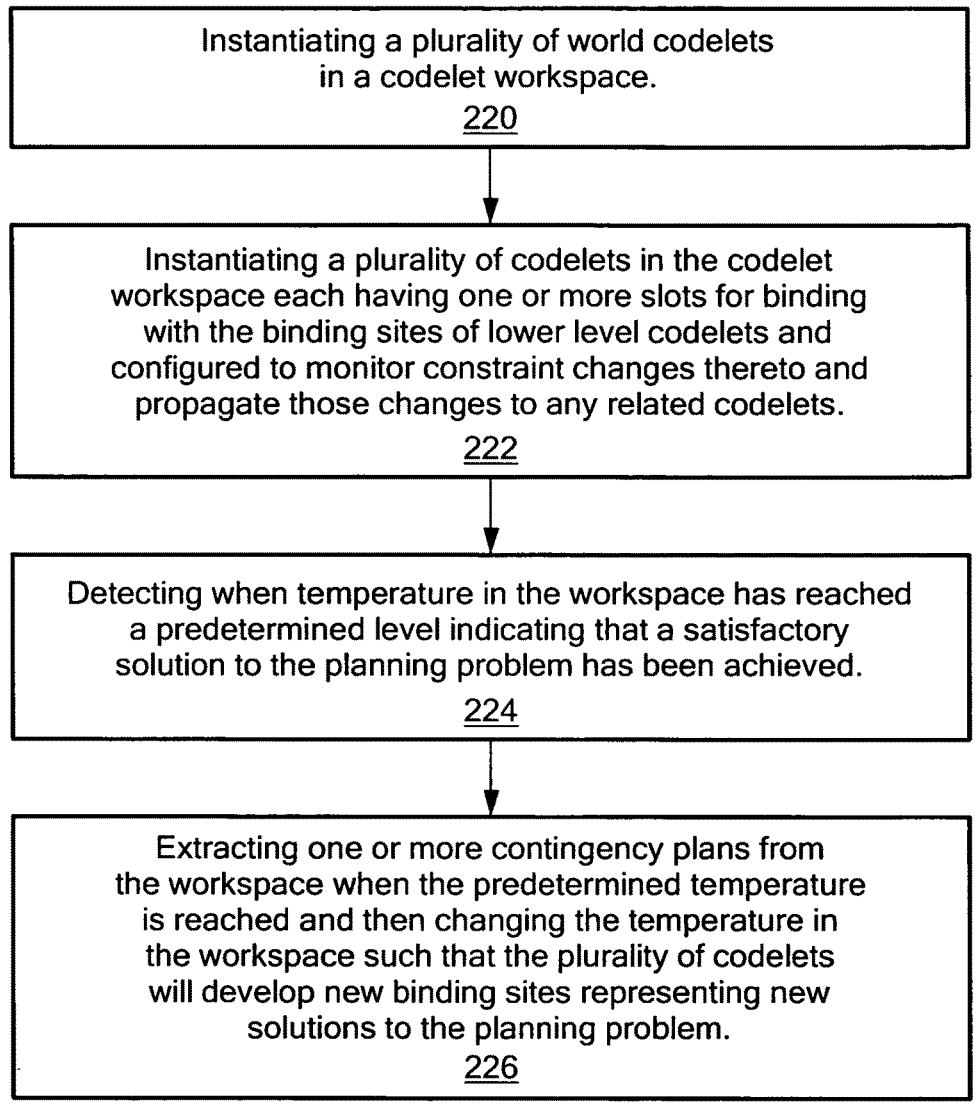
FIG. 5 is a block diagram showing one embodiment of the primary steps of the contingency planning method of this invention.

One embodiment of the contingency planning method of this invention includes instantiating a plurality of world codelets in the codelet workspace, step 220, FIG. 5. A plurality of codelets is instantiated in the codelet workspace, each having one or more slots for binding with the sites of lower level codelets and each configured to monitor constraint changes thereto and propagate those changes to any related codelets, step 222. The method detects when the temperature in the codelet workspace has reached a predetermined level indicating a satisfactory solution to the planning problem has been achieved, step 224. One or more contingency plans from the codelet workspace are extracted when the predetermined temperature is reached and the temperature in the codelet workspace is changed such that the plurality of codelets will develop new bindings representing new solutions to the planning problem, step 226. In one embodiment, the method may include the step of providing situational updates that affect the constraints of one or more of the plurality of codelets instantiated in the codelet workspace. The method may include the step of determining a satisfaction level in the codelet workspace which represents the amount of binding between the slots of codelets in the binding sites of lower level codelets and the amount of time instantiated codelets have been in the codelet workspace. The method may include the step of providing a slipnet network responsive to activation energy of related bound codelets in the codelet workspace and activating certain concept nodes based on the activation to increase or decrease the probability of instantiating codelets of a certain type in the codelet workspace. The method may include the step of raising or lowering temperature in the codelet workspace as a function of the activation energy of bound codelets. The method may include the step of detecting unbound codelets in the codelet workspace and raising the temperature therein as a function of the number of unbound world codelets. The method may include the step of raising the temperature in the codelet workspace such that the plurality of codelets will develop different bindings representing a different solution to the planning problem.

The result is system and method embodiments of this invention that provide a way to focus the search in order to prune out less effective alternatives sooner by applying competition constantly. In addition, the system and method embodiments encourage cooperative solutions that are more efficient than individual efforts. The system and method embodiments promote natural adaptation of the contingency plans as the mission evolves and new data is received because each codelet in the hierarchy monitors its own assumptions and constraints. Any violation causes the affected codelet to either adapt or fail, which can cause a ripple effect in any elements such codlet supports. This causes the temperature subsystem to increase the temperature, which causes the codelets to form new binding such that the codelets will develop new solutions to the planning problem. Thus, system and method embodiments have a natural mechanism for discovering and repairing affected parts of the plan. In contrast, the conventional planning approaches discussed in the Background section above would need to re-plan from scratch.

The system and method also provides a situation analysis mechanism that accommodates analyzing all the sources of potential risk to an operation and to assess the likelihood of each as a function of time and space. This provides a sound analytical basis for then planning and allocating resources as needed to avoid or otherwise prepare for the most significant risks.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A contingency planning system apparatus comprising:
   a world description subsystem responsive to data representing a description of the world related to a planning problem and configured to instantiate a plurality of world codelets in a codelet workspace;
   a coderack subsystem responsive to a slipnet network and configured to instantiate a plurality of codelets in the codelet workspace, each having one or more slots for binding with binding sites of lower level codelets and each configured to monitor constraint changes thereto and propagate those changes to any related codelets;
   a temperature subsystem configured to detect when temperature in the codelet workspace has reached a predetermined temperature indicating a satisfactory solution to the planning problem has been achieved; and
   a plan extractor responsive to the temperature subsystem and configured to extract, by a computer processor, one or more contingency plans from the codelet workspace when the predetermined temperature is reached and configured to cause the temperature subsystem to change the temperature in the codelet workspace such that the plurality of codelets will develop new bindings representing new solutions to the planning problem.

2. The system of claim 1 in which the world description subsystem is responsive to an environmental interface which provides situational updates which may affect the constraints of one or more of the plurality of codelets instantiated in the codelet workspace.

3. The system of claim 1 in which a population of world codelets instantiated in the codelet workspace are configured to represent a description of the world as it relates to the achieving the goals of the planning problem.

4. The system of claim 1 in which the codelet workspace is configured to determine a satisfaction level therein which represents the amount of binding between the slots of codelets and the binding sites of lower level codelets and the amount of time instantiated codelets have been in the codelet workspace.

5. The system of claim 4 in which the binding of codelets to other codelets in the codelet workspace increases the satisfaction level in the codelet workspace.

6. The system of claim 5 in which the satisfaction level in the codelet workspace is affected by competition and cooperation between instantiated codelets in the codelet workspace.

7. The system of claim 4 in which the slipnet network includes a plurality of linked concept nodes wherein each node represents a type of codelet, each link represents a relationship between two types of codelets, and the collection of linked concept nodes represents an ontology of concepts.

8. The system of claim 7 in which the slipnet network is responsive to activation levels of related types of bound codelets in the codelet workspace and is configured to activate certain concept nodes based on the activation level in order to increase the probability the coderack subsystem will instantiate a codelet of a particular type relevant to achieving the solution to the planning problem.

9. The system of claim 4 in which the temperature subsystem is configured to raise or lower the temperature in the codelet workspace as a function of the satisfaction level.

10. The system of claim 9 in which the temperature subsystem is configured to detect unbound world codelets in the codelet workspace and raise the temperature in the codelet workspace as a function each unbound world codelet.

11. The system of claim 1 in which the plan extractor subsystem notifies the temperature subsystem to raise the temperature in the codelet workspace such that the plurality of codelets will develop different bindings representing a different solution to the planning problem.

12. The system of claim 1 in which the plurality of codelets are distributed among different physical computing devices.

13. A contingency planning method comprising:
    instantiating a plurality of world codelets in a codelet workspace;
    instantiating a plurality of codelets in the codelet workspace each having one or more slots for binding with the binding sites of lower level codelets and each configured to monitor constraint changes thereto and propagate those changes to any related codelets;
    detecting when temperature in the codelet workspace has reached a predetermined level indicating that a satisfactory solution to the planning problem has been achieved; and
    extracting one or more contingency plans from the codelet workspace when the predetermined temperature is reached and then changing the temperature in the codelet workspace such that the plurality of codelets will develop new bindings representing new solutions to the planning problem.

14. The method of claim 13 further including the step of providing situational updates that affect the constraints of one or more of the plurality of codelets instantiated in the codelet workspace.

15. The method of claim 13 further including the step of determining a satisfaction level in the codelet workspace which represents the amount of binding between the slots of codelets in the binding sites of lower level codelets and the amount of time instantiated codelets have been in the codelet workspace.

16. The method of claim 15 further including the step of providing a slipnet network responsive to an activation level of related bound codelets in the codelet workspace and activating certain concept nodes based on that the activation level to increase the probability of instantiating codelets of a particular type in the codelet workspace.

17. The method of claim 15 further including the step of raising or lowering temperature in the codelet workspace as a function of the satisfaction level.

18. The method of claim 17 further including the step of detecting unbound codelets in the codelet workspace and raising the temperature therein as a function of each unbound world codelet.

19. The method of claim 13 further including the step of raising the temperature in the codelet workspace such that the plurality of codelets will develop different bindings representing a different solution to the planning problem.

\* \* \* \* \*